June 30, 1931.  C. R. TAGGART  1,812,180
LATHE DOG
Filed Oct. 7, 1929
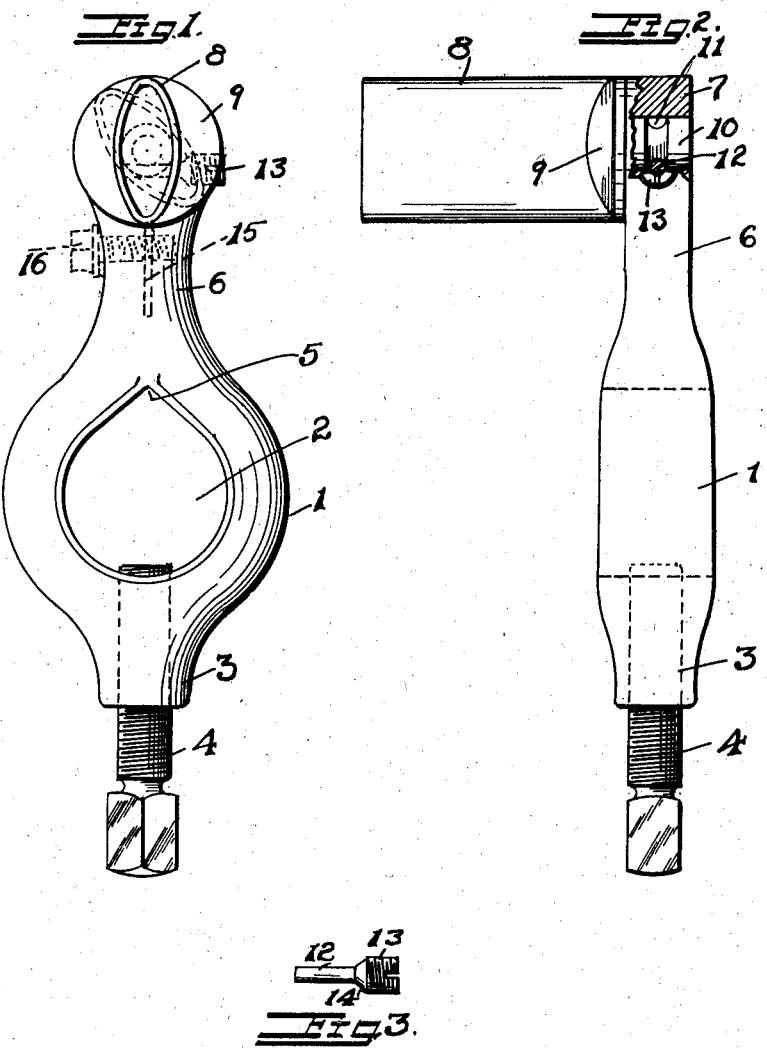
INVENTOR.
Charles R. Taggart,
BY Baldwin Yale
ATTORNEY Patented June 30, 1931

1,812,180

UNITED STATES PATENT OFFICE

CHARLES R. TAGGART, OF SAN FRANCISCO, CALIFORNIA

LATHE DOG

Application filed October 7, 1929. Serial No. 397,813.

This invention relates particularly to lathe dogs.

Among the objects of the invention is to provide means for taking up the lost motion between the lathe dog in its engagement with the face plate, to prevent slipping and chattering of the work being held by the dog. Other objects and advantages will appear as the description progresses.

In this specification and the annexed drawings the invention is disclosed in its preferred form. But it is to be understood that it is not limited to this form, because it may be embodied in other forms. It is also to be understood that in and by the claims following the description it is desired to cover the invention in whatsoever form it may be embodied.

In the one sheet of drawings:

Figure 1 is a front elevation of a lathe dog constructed in accordance with this invention.

Figure 2 is a side elevation of the same, partially broken away to disclose the construction of the adjusting means.

Figure 3 is a detail of the adjusting set screw.

In detail the construction illustrated in the drawings comprises the modified lathe dog, having the circular body portion 1, with the hole 2 therethrough to receive the work to be held.

The lug 3 is threaded to receive the set screw 4, adapted to force the work into the V shaped jaw 5 to hold the same against rotation in the dog, in the usual manner.

The neck 6 extends outward from the body 1, and terminates in a rounded hub 7, having an axial hole therethrough. The torque tail 8 is substantially oval in cross section and has the cheek plate or flanged head 9 formed thereon adapted to set flush with the faced side of the hub 7.

The stud 10 is preferably formed integrally with the tail 8. It fits snugly within the hole through the head 7. It has the annular groove 11 therein to engage the stem 12 of the transverse set screw 13, transversely threaded in the head 7. The taper shoulder 14 is adapted to jam in the groove 11 to lock the tail 8 in the desired adjusted position.

Lathe dogs are used in conjunction with face plates on lathe spindles. A live center is fixed in the head stock in alignment with a similar dead center in the tail stock. The "work", which may be a shaft, has its opposite ends centered to engage the said centers. The work passes through and is clamped in the hole 2 by the set screw 4.

The tail 8 on the dog, extends through one of the plurality of radial slots formed through the face plate. These plates are usually cast iron with the slots cored through the cross section of the plate, and are left unfinished or rough. It is therefore impossible to fit the conventional dog snugly into one of these slots. If there is any play or freedom between the dog and the face plate, the work will chatter or back lash, making it impossible to achieve accuracy in thread turning or tooling the work.

It has been the practice heretofore to introduce shims and wedges between the sides of the tail and the sides of the slot in the face plate, with indifferent results, loss of time and often loss of the work itself, in cutting threaded spindles and other accurate turning.

The present dog is applied in accordance with the conventional practice, except that the necessity for wedging is eliminated. The tail 8 is inserted in the slot in the face plate and turned on its stud 10 until both edges of the tail contact both sides of the slot in the face plate.

Thus adjusted, the set screw 13 is set up tight until the shoulder 14 wedges against the stud 10 and fixes the tail in its adjusted position in the slot of the face plate.

The advantage of the groove and stem engagement 11, 12, is that the set screw 13 can be backed out of the set position, for the swiveling of the tail, without releasing the stud 10 from the head 11.

In very heavy dogs it may be desirable to provide a taper stud and head engagement 10, 7, with a jam nut threaded on the stud to bear against the outer face of the head 7.

Another optional modification is suggested in dotted lines in Figure 1, comprising a slot 15, leading from the hole in the head 7, down into the neck 6. The transverse screw 16 threaded in the neck would pinch the stud 10 in the head 7.

The invention has been described in its application to lathe work. It is equally applicable to use in gear cutting mills, wherein it is essential that the gear blank be held in its original adjusted position to insure precision in the finished gear. Its application to other uses will be manifest to those skilled in the art.

Having thus described this invention what is claimed and desired to secure by Letters Patent is:

1. A lathe dog having a tail swiveled in its head and means for setting said tail in adjusted angular positions.

2. A lathe dog having a head with a hole therethrough, a tail having a stud rotatably engaging said hole, and means for locking said tail in adjusted angular positions.

In testimony whereof I have hereunto set my hand this 26th day of September, A. D. 1929.

CHARLES R. TAGGART.